United States Patent
Donahoe et al.

(10) Patent No.: US 7,290,950 B2
(45) Date of Patent: Nov. 6, 2007

(54) EPSON SCRAPBOOK CENTRAL™ REPRODUCTION SYSTEM

(75) Inventors: Colin Donahoe, Palos Verde Estates, CA (US); Frank Martin, San Clemente, CA (US)

(73) Assignee: Epson America, Inc., Long Beach, CA (US)

( * ) Notice: Subject to any disclaimer, the term of this patent is extended or adjusted under 35 U.S.C. 154(b) by 443 days.

(21) Appl. No.: 11/056,900

(22) Filed: Feb. 11, 2005

(65) Prior Publication Data

US 2006/0192991 A1    Aug. 31, 2006

(51) Int. Cl.
*B41J 11/44* (2006.01)

(52) U.S. Cl. .............................. 400/76; 400/61; 400/62

(58) Field of Classification Search .................. 400/76, 400/61, 62
See application file for complete search history.

(56) References Cited

U.S. PATENT DOCUMENTS

| | | | |
|---|---|---|---|
| 6,476,827 B1 * | 11/2002 | Porter | 715/738 |
| 6,660,119 B2 * | 12/2003 | Allen et al. | 156/226 |
| 7,000,192 B2 * | 2/2006 | Allen et al. | 71/764 |
| 2002/0040375 A1 * | 4/2002 | Simon et al. | 707/517 |
| 2002/0180203 A1 * | 12/2002 | McIntyre et al. | 281/22 |
| 2004/0088420 A1 * | 5/2004 | Allen et al. | 709/229 |

* cited by examiner

*Primary Examiner*—Minh Chau
(74) *Attorney, Agent, or Firm*—Pillsbury Winthrop Shaw Pittman LLP

(57) ABSTRACT

A full-size scrapbook page is scanned by n image scanner. A computer device receives an image of the scanned full-size scrapbook page. The full-size scanned scrapbook page is displayed on a display screen coupled to the display device. The full-size scanned scrapbook page is accepted to create an accepted scrapbook page. The accepted scrapbook page image is transferred to an image printer and is printed on the image printer. The results is a high-quality color copy or reproduction of the original scrapbook page.

17 Claims, 16 Drawing Sheets

EPSON SCRAPBOOK CENTRAL™ REPRODUCTION SYSTEM

BACKGROUND

Scrapbooking, or the making of scrapbook pages, where an artistic page is created from images, is very popular in both the United States and Europe. Many people have "scrapbooking parties" where a host provides scrapbooking materials (such as paper, borders, ideas for layout) to participants. The scrapbooking materials can be very expensive. In addition, if a scrapbook page is created and is well received by the scrapbooking participants, it is very difficult to duplicate because the duplication of the scrapbook pages must be done by hand.

Electronic scrapbooking systems can also be utilized to create scrapbooking pages. While it may be easier to make copies of digital scrapbooking pages because multiple copies of a page may be sent to an image printer, a user has to have a computer, scrapbook software, and a high-quality image printer with appropriate image quality photo paper in order to produce an original professional or acceptable scrapbook page. At the aforementioned "scrapbooking" parties, it is usually not possible for each scrapbooking participant to have a computer and scrapbooking software. Also, scrapbooking enthusiasts do not feel that electronic creation of a scrapbook is similar artistically to creation of a scrapbook by hand (or by cutting and pasting).

Accordingly, a need exists for a system to be in place that allows for scrapbooking participants to be able to easily create scrapbooking pages and easily make copies of the scrapbooking pages. In addition, in most cases, many scanners do not allow for a full-size scrapbook pages (12" by 12") to be scanned. Most Printers also do not allow for a full-size scrapbook page (12" by 12") to be printed. Accordingly, an additional need exists to allow users to scan full size scrapbook pages utilizing an image scanner, to store as an image a full size scrapbook page, and to print, on an image printer, a full-size scrapbook page.

DETAILED DESCRIPTION OF THE INVENTION

Figure 1:
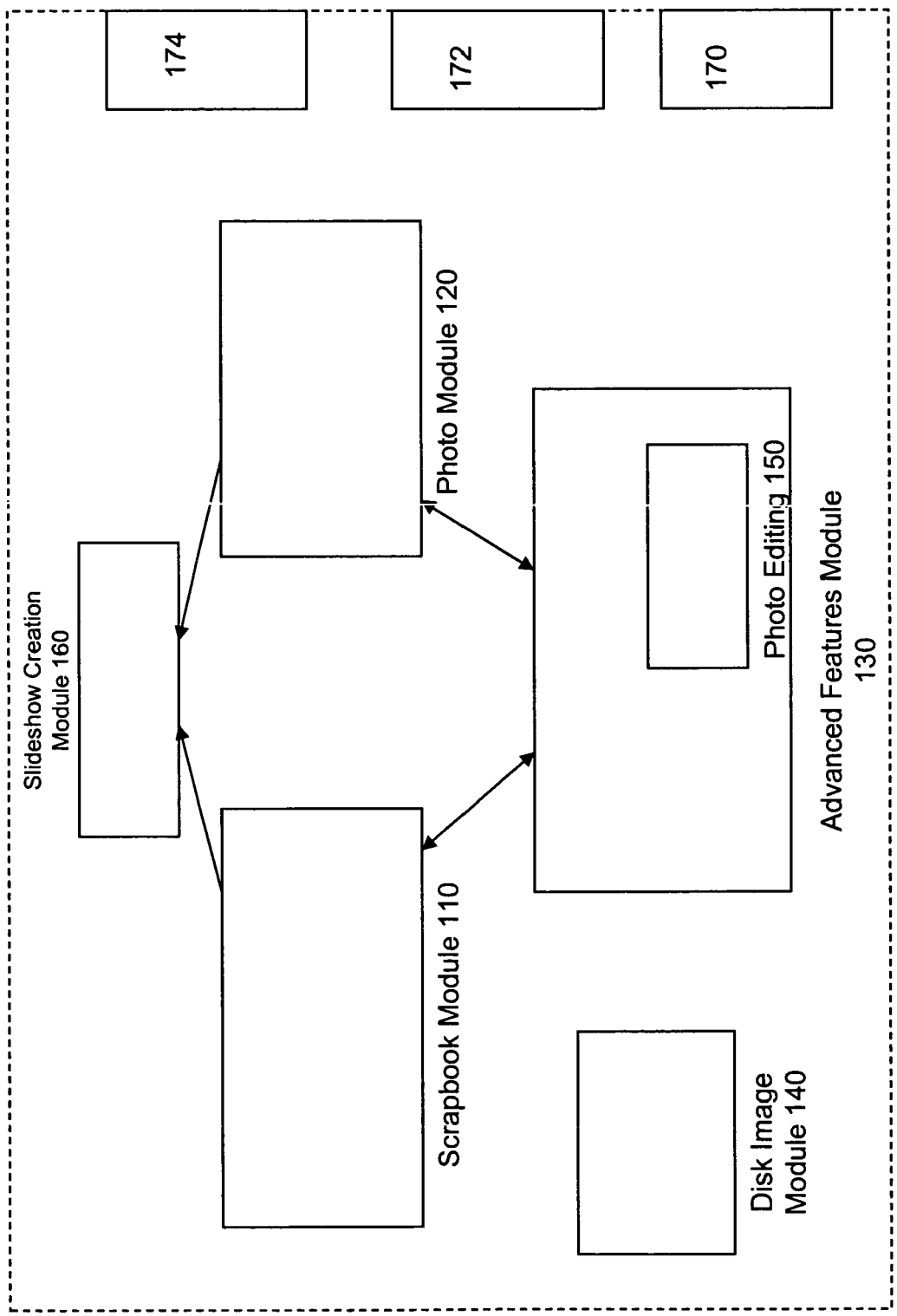
FIG. 1 illustrates software installed on the Epson Scrapbook Central™ reproduction system according to an embodiment of the present invention

The Epson Scrapbook Central™ reproduction system can be utilized by retail or store personnel to provide imaging products and scrapbooking products to customers or users who bring in images to a retail environment. The Epson Scrapbook Central™ reproduction system 100 (which may also be referred to as the Epson Scrapbook Central™ system 100) is to be utilized by retail or store personnel and not users and may not be accessible to customers or users. The Epson Scrapbook Central™ is more of a copy center or reproduction device, as compared to a photo or imaging kiosk, because the customer or user provides the photos, scrapbooks, or digital media to the retail or store personnel and the retail or store personnel fulfills the customer request, manages the job, and produces the customer's or user's products. Under certain operating conditions, a retail store may own or lease one or more Epson Scrapbook Central™ Systems and could rent out rooms to individuals who are organizing scrapbooking events. The Epson Scrapbook Central system is small enough that it may be placed on a movable cart and be able to be easily moved from one location to another location.

The Epson Scrapbook Central™ reproduction system 100 may be utilized to copy customer's scrapbook pages. The Epson Scrapbook Central™ system 100 may be utilized to produce or reproduce custom or basic scrapbooking backgrounds from digital media. The digital media which can be utilized in the Epson Scrapbook Central™ system may include memory cards (SD media, MicroDrive, MMC, Memory Stick, USB memory devices, etc). The Epson Scrapbook Central™ system 100 may produce or generate photo prints, graphical product prints, and enlargements from digital media. The Epson Scrapbook Central™ system 100 may generate photo prints, graphic product prints, and enlargements from photos which are scanned in from a scanner which is part of the Epson Scrapbook Central system 100. The Epson Scrapbook Central™ system 100 may produce photo prints, graphical product prints, scrapbook pages, and enlargements from advanced or custom scrapbooking features.

Under certain operating conditions, the Epson Scrapbook Central system 100 may produce or generate photo CDs or archive images on other digital storage media. The Epson Scrapbook Central™ system 100 may digitally correct, fix, or adjust photos before the photos or images are printed. The prints may be produced in color, black & white, sepia, or a number of duotone colors, and the prints may be printed on various papers and with various finishes. The Epson Scrapbook Central™ system 100 may produce products (photos, prints, etc.) including customizable text. The Epson Scrapbook Central™ system 100 may produce or print receipts or records of job orders.

The Epson Scrapbook Central™ system 100 may also allow administration functions to be performed by retail or store personnel. The Epson Scrapbook Central™ reproduction system allows the management of customer orders by first displaying the customer order. The customer order may be edited. The Epson Scrapbook Central™ system 100 may automatically print the customer orders or may allow for manual printing of the order.

Additional administration functions that may be performed include the ability to produce reports. Products may be established and pricing may be established. The Epson Scrapbook Central™ system allows the establishment of user accounts and administrator's rights. The Epson Scrapbook Central™ system also allows the establishment of discounts for certain user accounts and also allows for certain store or retail personnel to establish an appropriate discount.

FIG. 1 illustrates software installed on the Epson Scrapbook Central™ system 100 according to an embodiment of the present invention. The software installed on the Epson Scrapbook Central system 100 may include three modules. The three modules may be a scrapbook function module 110, a photo printing module 120, and custom or advanced function module 130. The custom function module 130 may have access limited to advanced (trained) operators or administrators. These three modules may be resident on a computing device which is part of the Epson Scrapbook Central™ system. Under certain operating conditions, output from either the scrapbook function module 110 or the photo printing module 120 may utilize the customer function module 130 to enhance images that are being processed by either the scrapbook function module 110 or the photo printing module 120.

In an embodiment of the invention, the Epson Scrapbook Central™ system 100 may also include additional software modules. The Epson Scrapbook Central™ system 100 may include a disk imaging module 140, such as the Norton Ghost™ utility software. The Epson Scrapbook Central™ system 100 may include photo editing software 150, such as the Adobe Photoshop Elements™ software. The Adobe Photoshop Elements™ software may be resident within the advanced or custom software 130 (as illustrated in FIG. 1) or may be linked to the advanced or customer software module 130. The Epson Scrapbook Central system 100 may include a slideshow creation software module 160, such as Arcsoft's DVD Slideshow™ software. The Epson Scrapbook Central™ reproduction system 100 may also include software drivers other accessories, such as an imaging printer driver 170, a secondary printer driver 172, and a scanner driver 174.

Figure 2:
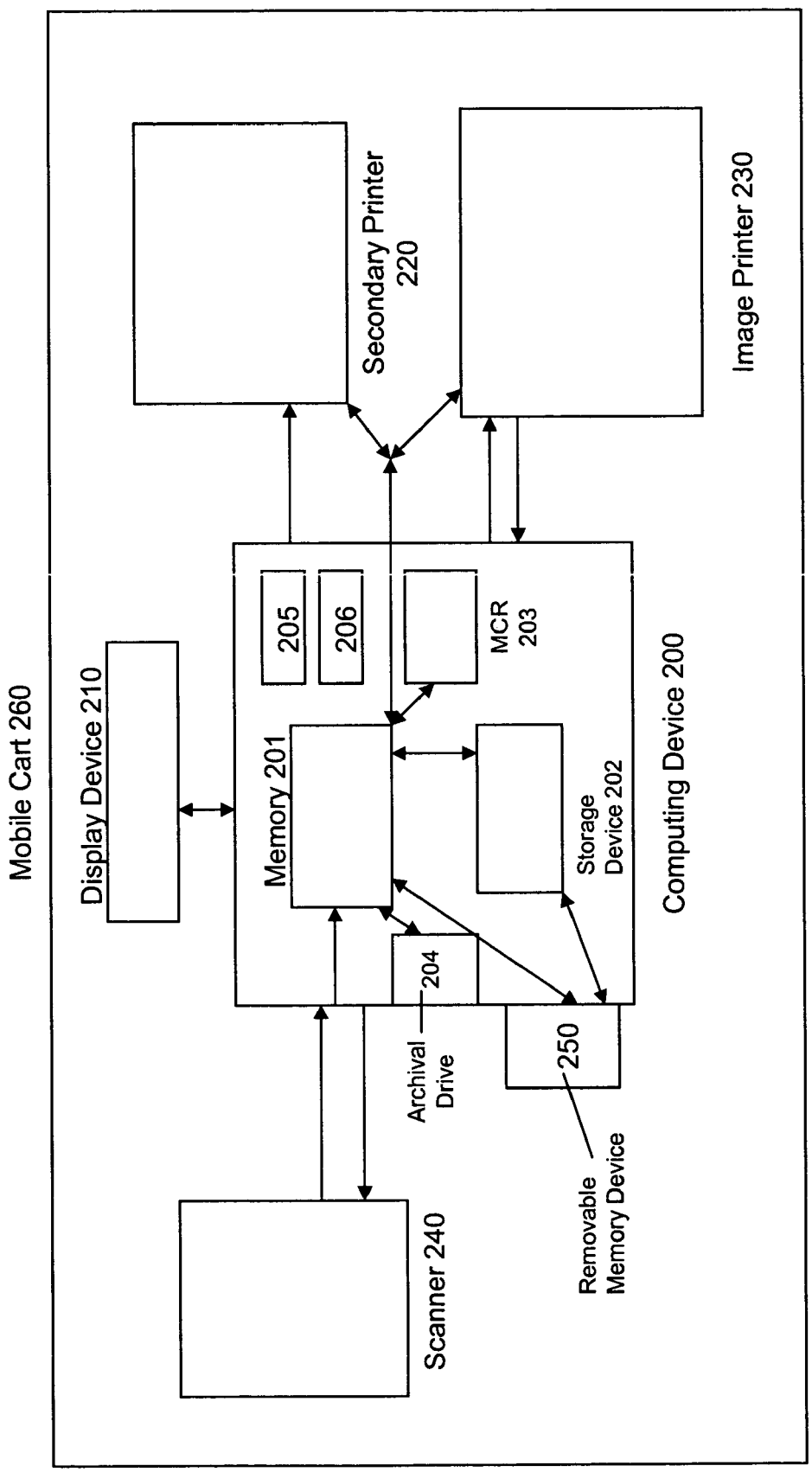
FIG. 2 illustrates hardware components of an Epson Scrapbook Central™ reproduction system according to an embodiment of the present invention.

FIG. 2 illustrates hardware components of an Epson Scrapbook Central system 100 according to an embodiment of the present invention. The Epson Scrapbook Central system 100 includes a personal computer or computing device 200, a computer display 210, a secondary printer 220, an image printer 230, an image scanner 240, and a removable memory device 250. In an embodiment of the invention, all of the above-identified components are installed on a cart 260 that is movable or transportable The computing device 200 may also include memory 201, a hard disk drive or other non-volatile memory device 202, a memory card reader 203, an archive drive 204, e.g., a DVD-RW (optical read-write) drive, a CD-RW drive, a writable optical disk drive, a keyboard 205, and a mouse 206.

In an embodiment of the invention, the memory card reader 203 may be a 7-in-1 memory card reader. This may allow for multiple manufacturers of digital media to be accepted for providing images into the Epson Scrapbook Central™ system. In other embodiments of the invention, the memory card reader 203 may be a 2-in-1, a 3-in-1, a 4-in-1, a 5-in-1, or a 6-in-1 memory card reader.

In an embodiment of the invention, the display device 210 may be a touch screen LCD monitor. This allows for easy manipulation of the selected menu items and for quick training for new retail store personnel. In other embodiments of the invention, other displays may be utilized.

In an embodiment of the invention, the secondary printer 220 may be a narrow carriage ink jet printer. Illustratively, the secondary printer 220 may be an Epson R800 pigment-base inkjet printer. Under certain operating conditions, the secondary printer 220 may print images or photos that are input to the system. Under certain operating conditions, the secondary printer 220 may print receipts or bills for jobs completed by the Epson Scrapbook Central™ system 100.

In an embodiment of the invention, the image printer 230 may be a wide carriage ink jet printer. This allows large format (in terms of length and width) print media to be utilized in the Epson Scrapbook Central™ system 100. Illustratively, the image printer 230 may be an Epson R1800 wide carriage, pigment-based inkjet printer.

The image printer 230 may have the capability of printing to the edge of a 12"×12" scrapbook page. This feature may be referred to as "borderless" printing. The image printer 230 may be able to print on cut sheet paper (such as A4, letter, B5, Legal, Executive, A5, A6), on envelopes, on postcards (as small as 100 mm by 148 mm), bright white ink jet paper, premium bright white paper, premium ink jet plain paper, photo quality ink jet paper, matte-paper heavyweight paper, archival matte paper, premium glossy photo paper, premium semi-gloss photo paper, premium luster photo paper, ink jet transparencies, ink jet note cards, ink jet greeting cards, photo-quality self-adhesive sheets, and iron-on cool peel transfer paper. The image printer 230 may include cartridges such as photo-black, matte-black, magenta, cyan, yellow, magenta, red, violet, and clear. Accordingly, the image printer 230 may support 8 color printing. Pigment ink is also supported. In embodiments of the invention, a separate ink cartridge is provided for each color. The image printer may utilize various communication protocols. Under certain operating conditions, the computing device 200 may communicate with the image printer utilizing the IEEE-1394 protocol (Firewire), the Universal Serial Bus (USB) protocol, or via a wireless protocol (such as IEEE 802.11g wireless communication protocol). In embodiments of the invention, the image printer 230 may support up to 5760 (height) dpi by 1440 (V) dpi.

The Epson Scrapbook Central™ reproduction system 100 may include a security feature to prevent inadvertent comprising of the system. If the Epson Scrapbook Central™ system 100 is logged into a Supervisory mode and there has been no activity measured by the system 100 for a predetermined amount of time, e.g., 3-5 minutes, then the supervisor mode is automatically logged out and the Epson Scrapbook Central™ system returns to a normal mode where the system 100 can be utilized to create Scrapbook pages or create photo prints. In other words, it returns to a normal mode where store or retail personnel can enter customer orders and create either scrapbook or photo pages.

The image scanner 240 may be a flatbed color image scanner. In an embodiment of the invention, the image scanner 240 may be a 12.2 inch×17 inch scanner and may include a transparency unit. The image scanner 240 may also include a film template which allows for scanning of 35 mm film. The image scanner may utilize a charge-coupled device (CCD) for completing the scanning. Illustratively, the CCD may be a 6 line CCD having 94,500 pixels. In an embodiment of the invention, the maximum scanning size may be 12.2×16.5 inches, which is larger than most image scanners designed for photo reproductions. The image scanner 240 may scan up to a resolution of 2400 dots per inch (dpi). The output resolution of the image scanner 240 may be 12,800 dpi. The pixel depth of the image scanner 240 may be 16 bits/pixel, both input and output. The image scanner 240 separates colors by color filters on the CCD. The image scanner 240 may include zoom capabilities of 50% to 200%. The image scanner 240 may interface to the computing device 200 via a USB interface, an IEEE 1394 interface, or via a wireless protocol, such as 802.11(g). The light source for the image scanner may be a xenon gas fluorescent lamp.

Figure 2B:
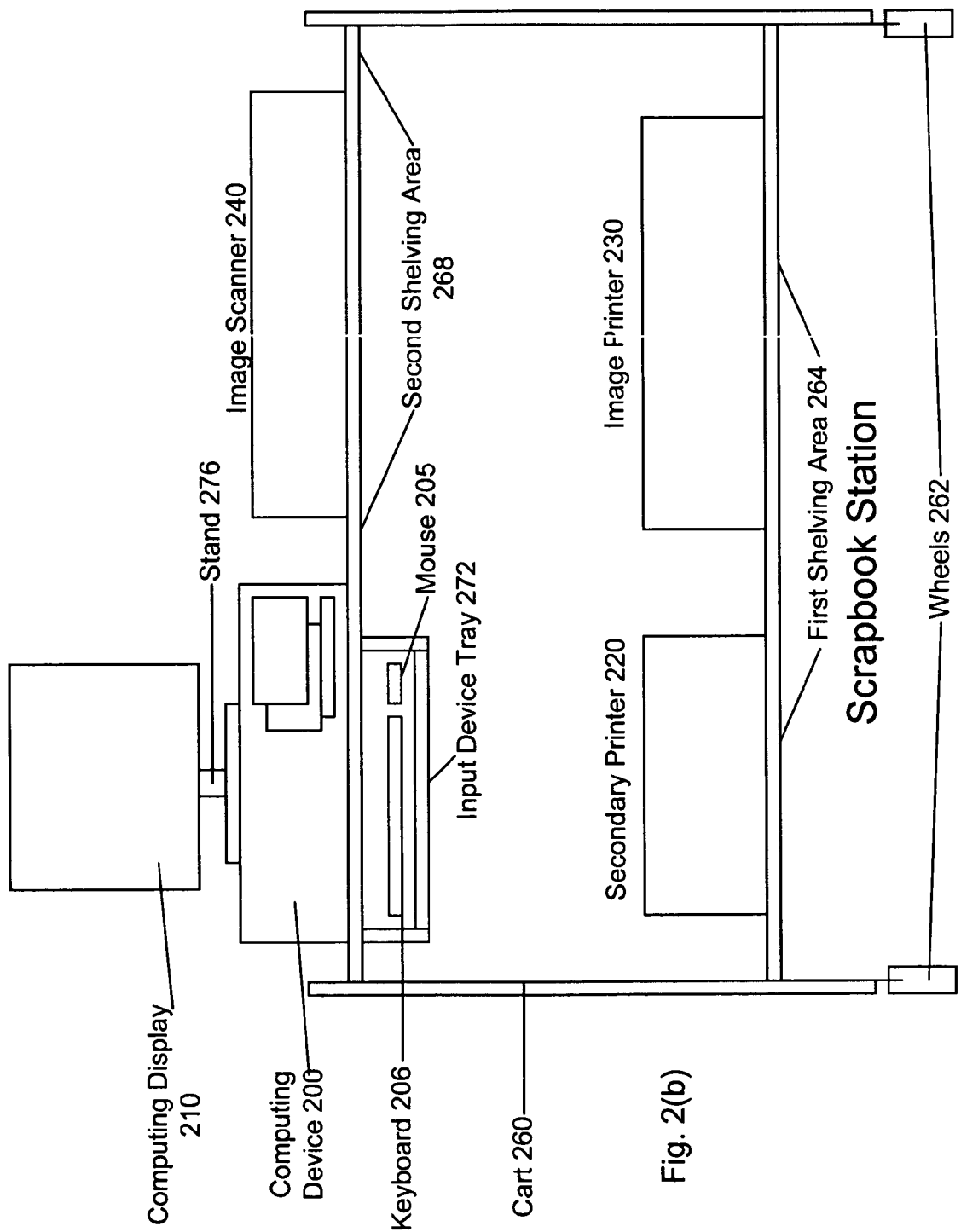

FIG. 2(b) illustrates a sample Epson Scrapbook Central cart and system according to an embodiment of the present invention. The cart 260 may include wheels 262 to allow for easy movement within a house, scrapbooking event location, or retail locations. The wheels 262 may include locking mechanisms to keep the Epson Scrapbook Central™ system within a single location. On a first shelving area 264, the cart 260 may have a secondary printer 220 and an image printer 230. In an embodiment of the invention, this first shelving area 264 may be located approximately one foot from a floor where the Epson Scrapbook Central™ system 100 is located. On an underside of a second shelving area 268, an input device tray 272 may be located which houses, illustratively, a mouse 205 and a keyboard 206. On a top side of the second shelving area 268, a computing device 200 may be located along with the image scanner 230. The computer display 210 may be located on top of the computing device 200 and may be placed on a stand 276. In an embodiment of the invention, the cart 260 may be 4 feet wide and may be 3 feet tall. In the embodiment of the invention illustrated in FIG. 2(b), a top of the computer display 210 may be located approximately 5 feet from the floor where the Epson Scrapbook Central™ system 100 is located.

Figure 2C:
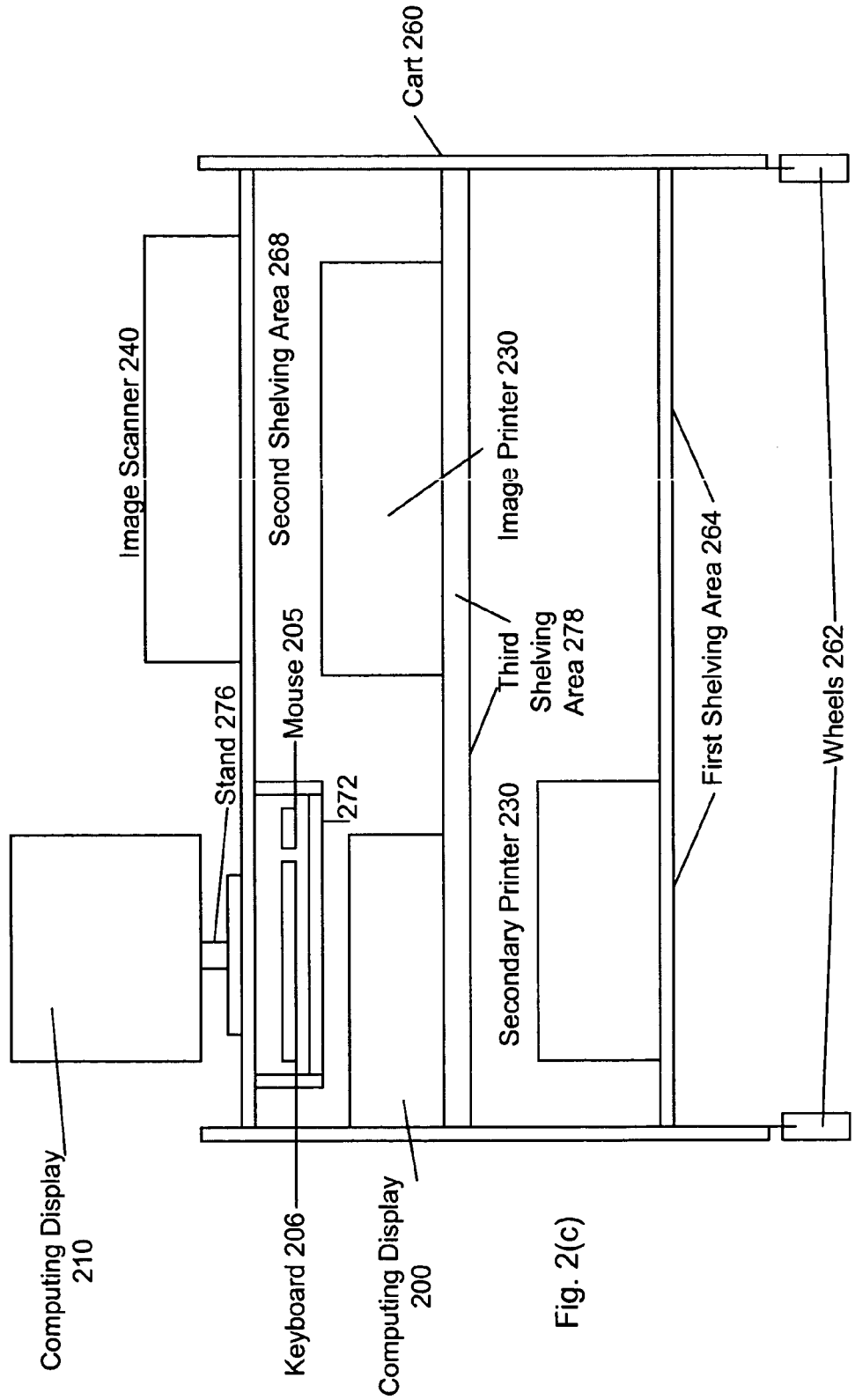
Figure 3:
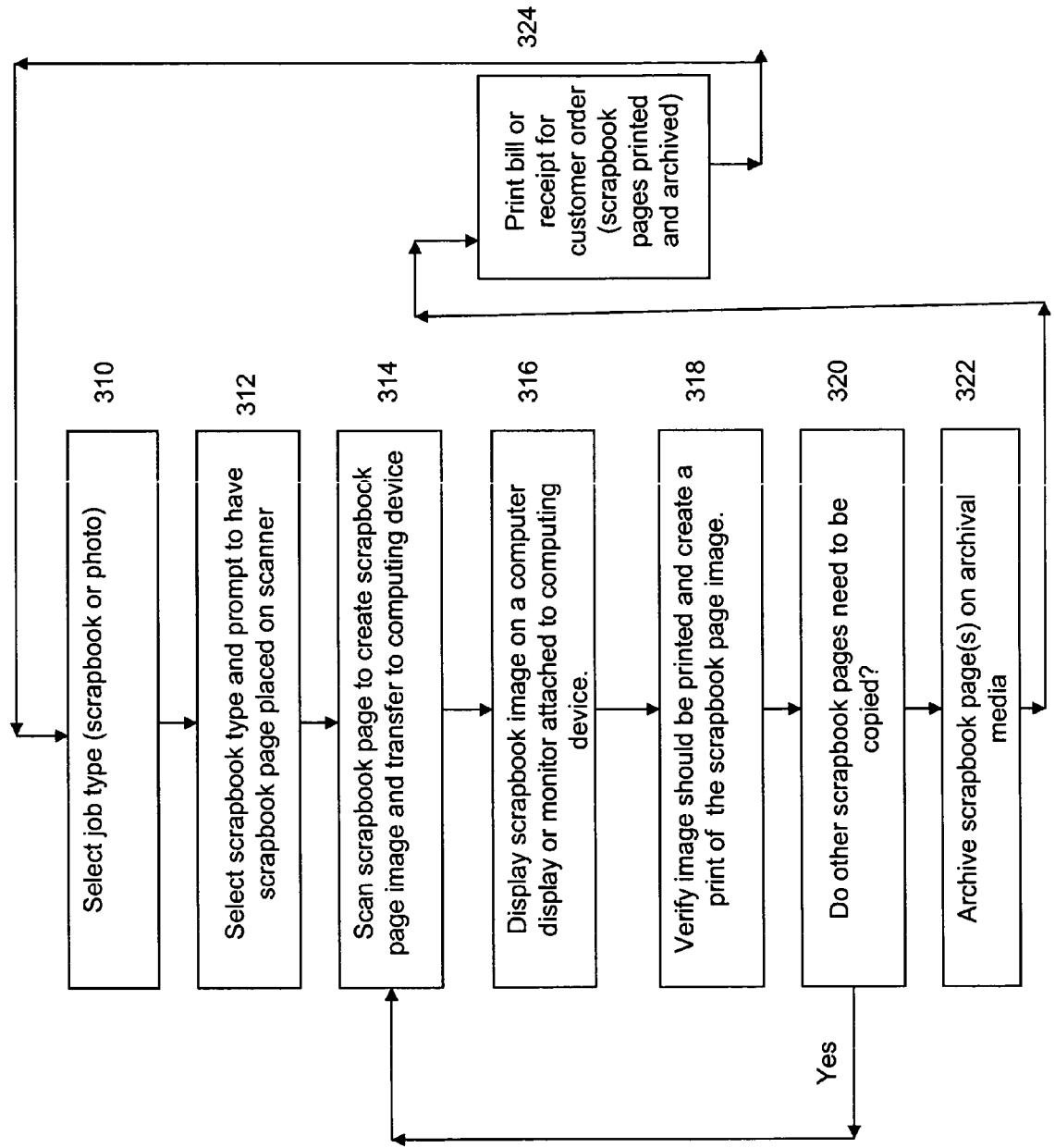
FIG. 3 illustrates a workflow for copying a scrapbook page according to an embodiment of the present invention.

FIG. 2(c) illustrates an alternative embodiment of an Epson Scrapbook Central™ system including a cart according to an embodiment of the present invention. As is illustrated in FIG. 3, a third shelving area 278 has been added to the cart 260. The computing device 200 has been moved to rest on top of the third shelving area 278. The image printer 230 has been moved to also rest on top of the third shelving area 278. The display 210 rests on the stand 276 which now rests on the second shelving area 268. The movement of the components of the Epson Scrapbook Central™ system 100 allows for a lower profile, in terms of height, for the entire system 100.

Figure 4:
FIG. 4 illustrates a sample input screen for selecting job type according to an embodiment of the present invention.

FIG. 3 illustrates a workflow for copying a scrapbook page according to an embodiment of the present invention. A retail or sales employee enters his or her identification and identifies that new customer order is to be processed. A job type is selected 310. In an embodiment of the invention, the job types that are selected maybe a scrapbook job, a photo job, a custom job or an existing job. FIG. 4 illustrates a sample input screen for selecting job type according to an embodiment of the present invention. A size for the job type may also be selected. Under certain operating conditions, the size selections may be 12" by 12", 8.5"×11", 8" by 8", and 6"×6". In scrapbooking circles, 12" by 12" is referred to as a full-size scrapbook page. Scrapbook enthusiasts do not consider that 8.5" by 11" is a full-size scrapbook page.

A scrapbook job may be selected 312 and a prompt or request may be generated to have a scrapbook page be placed on a scan bed of the image scanner. Under certain operating conditions, a user or retail/sales personnel may place the scrapbook page on the image scanner 240.

The image scanner 240 scans 314 the scrapbook page and transfers an image of the scrapbook page to the computing device 200. Illustratively, a scrapbook page image is transferred to the memory of the 201 of the computing device.

Under certain operating conditions, the scrapbook page is scanned in a single-pass by the image scanner 240.

The scrapbook page image is displayed 316 on the display device as a preview. The scrapbook page image may be accepted or rejected. If it is rejected, the image scanner 240 may scan the scrapbook page again and transfer the new scrapbook page image to the computing device. Illustratively, in order for the scrapbook page image to be displayed, the scrapbook page image is transferred from the memory 201 of the computing device to the display device 210.

The scrapbook page image may be printed 318 on the image printer 230. This may be referred to as a print of a scrapbook page image. A full-size reproduction of the scrapbook page image may be printed on the image printer 230. In other words, if a 12" by 12" scrapbook page was scanned, a 12" by 12" print of the scrapbook page image may be printed. The print of the scrapbook image may be printed on lignin-free acid-free paper. Under certain operating conditions, small sizes of scrapbook pages may be printed on the secondary printer 220. The Epson Scrapbook Central™ system 100 may request 320 if other scrapbook pages need to be printed. If an additional scrapbook page is to be printed, the image scanner 240 scans the new or additional scrapbook page.

The Epson Scrapbook Central™ system 100 may archive 322 the scrapbook page image. If the image of the scrapbook page(s) is to be archived, the Epson Scrapbook Central system may archive 326 the image of the scrapbook page(s) to an archival media, such as a CD or a DVD. The Epson Scrapbook Central System 100 allows a single image of the scrapbook page to be archived separately, a selected group of the scanned scrapbook page images, or all of the scanned scrapbook page images. In other words, if a user has scanned multiple scrapbook pages to create a plurality of scrapbook page images, then the user may select to archive one, a selected group, or all of the scrapbook page images.

After the image(s) of the scrapbook page(s) have been archived or have not been archived, the Epson Scrapbook Central™ System 100 may present or preview a bill on the computer display 210. The bill may be approved or edited and the bill may be authorized for printing on the secondary printer 220. The bill may be printed 324 on the secondary printer 220. After the bill is printed, the Epson Scrapbook Central System 100 may return to a main menu.

The scanner 240 of the Epson Scrapbook Central™ system 100 allows for a size reproduction of a 12" by 12" scrapbook page. Scanners that are attached to personal computer systems do not have the capability of scanning a 12" by 12" page. Under certain operating conditions, the scanner 240 may, in a single pass, scan the 12" by 12" page to produce a scrapbook page image. In other words, a scan at a lower resolution is not completed first. The scrapbook page image is not a page including multiple JPEG picture files. The scrapbook page image is a single image file which is a copy of the scrapbook page. Accordingly, there is no manipulation of certain placement on the scrapbook page, e.g., like in a digitally-created scrapbook page image, in this mode of the Epson Scrapbook Central™ system 100. The Epson Scrapbook Central™ system 100 may allow for editing or correcting of certain features or characteristics of scrapbook page image, such as contrast, brightness, red-eye removal.

After the displaying, editing, and/or correcting of the scrapbook page image, the Epson Scrapbook Central system 100 may print the scrapbook page image, in a 12" by 12" format on the image printer 230. Inkjet printers, of standard size for utilization with desktop computer, do not have the capabilities of printing on a 12" by 12" page. In an embodiment of the invention, the image printer 230 may allow for borderless printing of 12" by 12" pages on the image printer 230. In other words, the image printer 230 may allow for printing up to the edges of the 12" by 12" media.

Figure 5:
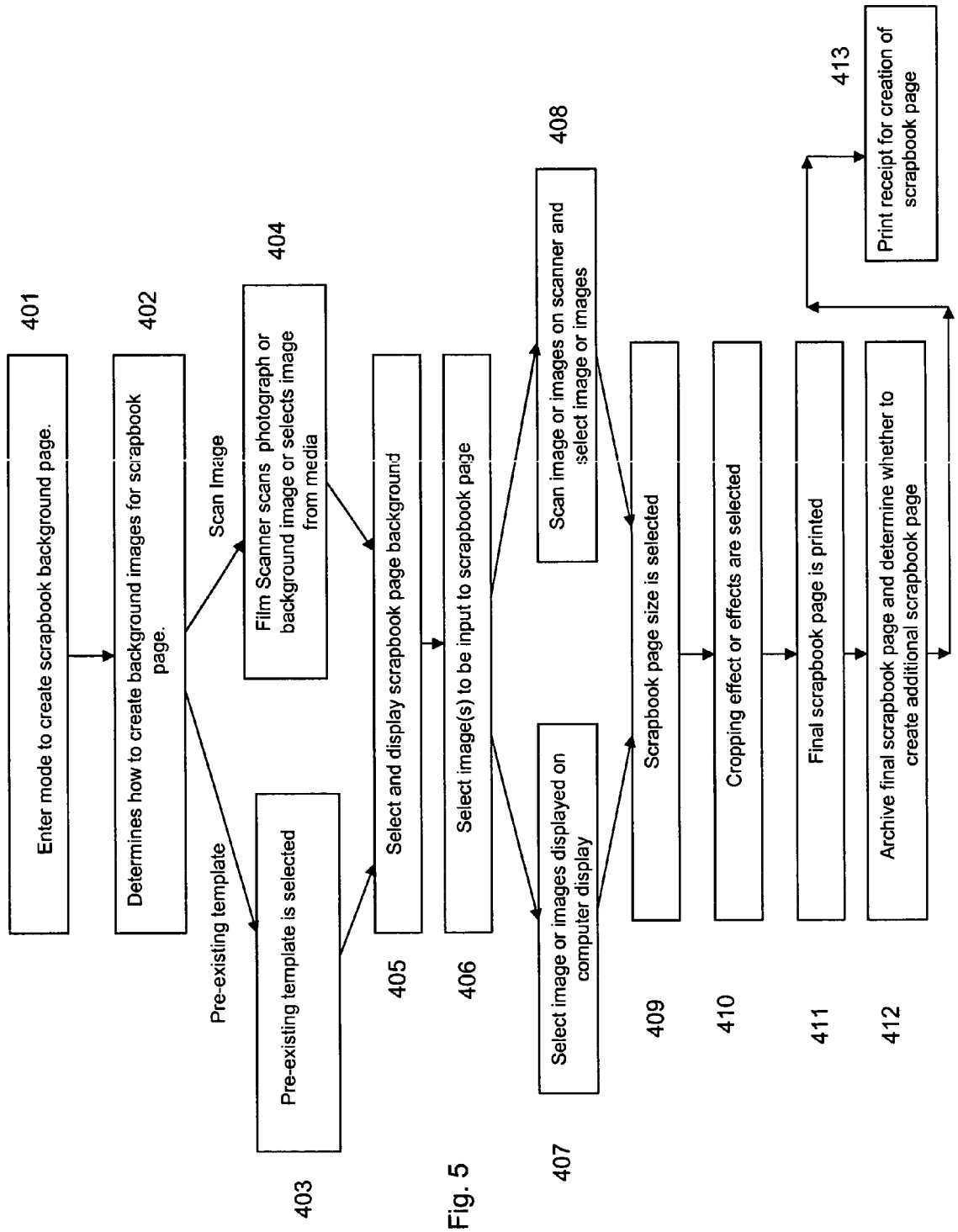
FIG. 5 illustrates a dataflow of creating a scrapbook background page according to an embodiment of the present invention.

The Epson Scrapbook Central™ system 100 may create custom scrapbook page backgrounds in any of the standard scrapbook sizes, e.g., 12"×12", 8" by 8", 6" by 6", and 8.5" by 11". FIG. 5 illustrates a dataflow of creating a scrapbook background page according to an embodiment of the present invention. Initially, the Epson Scrapbook Central™ reproduction system 100 enters 401 a create scrapbook background page function.

The Epson Scrapbook Central™ system 100 determines 402 whether a pre-existing scrapbook page template is to be utilized or whether a scrapbook page template is to be created. If a pre-existing scrapbook template is to be used, the pre-existing scrapbook template is selected 403. The pre-existing scrapbook template may allow for a choice of transparent or customizable templates that allow for a fixed or known set of transparent effects. For example, these templates may allow for the images to be placed in certain locations within a scrapbook page. If a scrapbook page template is to be created, then a background image or background style is selected 404. The background style or image may be resident on a storage device 202 (such as a hard disk) of the computing device 200, a digital media, (CD, DVD, optical disk, removable magnetic disk or memory card), or a photo or a background image may be scanned from the image scanner 230. The background image or style is stored and displayed 405 on the computer display.

Figure 6:
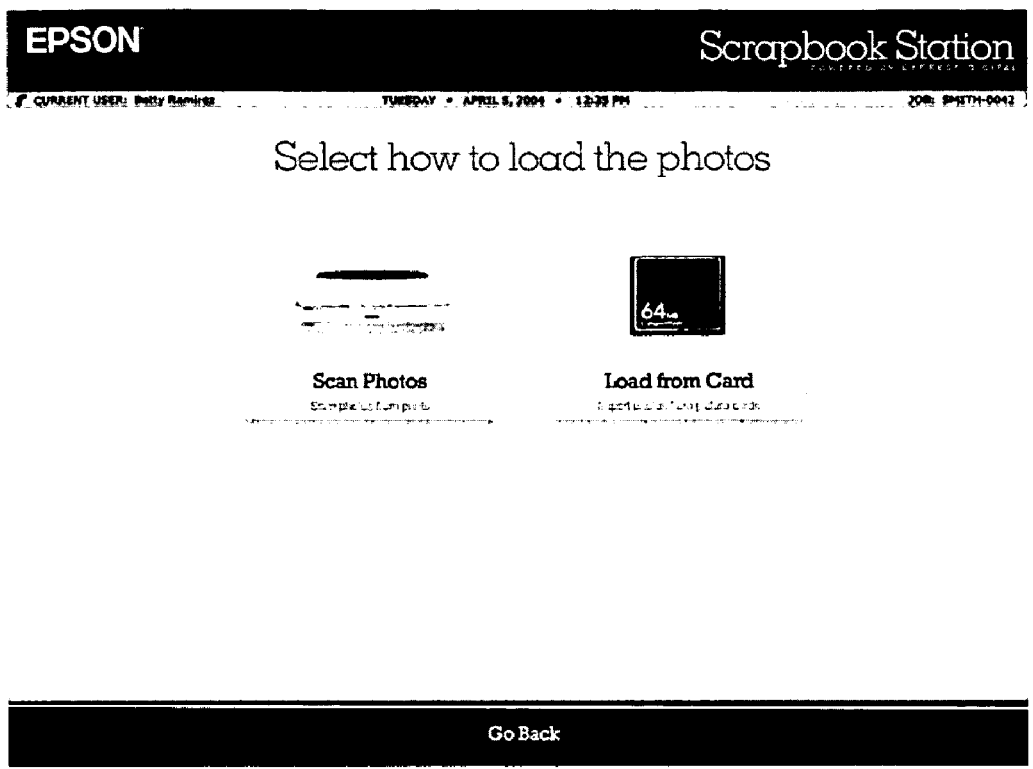
FIG. 6 illustrates an illustrative input screen for inputting information according to an embodiment of the present invention.

The Epson Scrapbook Central™ system 100 determines 406 a media on which an image is to be input as part of the scrapbook page into the Epson Scrapbook Central system 100. In other words, this image is not to be utilized as the background image. Illustratively, the Epson Scrapbook Central system 100 may utilize Flash memory cards, CDs, or DVDs as input medias. FIG. 6 illustrates an illustrative input screen for inputting information according to an embodiment of the present invention.

If the Epson Scrapbook Central system 100 utilizes flash memory cards, CDs, or DVDs, the computing device 200 may display thumbnails of the images available for selection and an image or images are selected 407 from the input images on the computer display 210. Under certain operating conditions, the Epson Scrapbook Central system 100 may utilize a scanner, such as image scanner 240, to create an image from a photo or a two-dimensional item. If the image scanner 240 is utilized, the scanner 240 scans the photo or two-dimensional item and displays 408 an image of the photo or two-dimensional item on the computer display 210. Under certain operating conditions, the Epson Scrapbook Central™ system allows for multiple images to either be input from the memory card, CD or DVD, or to be scanned utilizing the image scanner 240.

A scrapbook page size is selected 409. The Epson Scrapbook Central system identifies the shape of the scrapbook page based upon an input size of the scrapbook page. In other words, 12" by 12", 8" by 8" and 6" by 6" are square and 8.5" by 11" are rectangles, and may be entered or requested by the user.

A cropping effect may be selected 410 for the image(s). The Epson Scrapbook Central system 100 determines which cropping effect is to be utilized for the input image(s). Under certain operating conditions, retail personnel or store personnel may input the cropping effect. Illustrative cropping effects include faded, fade-to-white, and fade-to-border. Under certain operating conditions, if multiple images are input and are to be placed on the scrapbook page, each of the multiple images may have a unique cropping effect selected. Cropping effects may be accessed through the use of single button features with the Epson Scrapbook Central™ reproduction system or via external editing software, e.g., Watercolor and Art Pen. The selected cropping features may be displayed on the image(s). Illustrative photo cropping or editing features my include selecting between 1) black & white, sepia, or duotone effects; 2) enlarging, scaling, or cropping of the input photo; 3) fading to white, faded, or fading to border on one side or all sides; 4) edge type templates such as ragged edge; 5) adding text to images; and 6) selecting from graphic border overlay templates.

After the cropping effect (or effects) are selected for the images, the final scrapbook page is created. The final scrapbook page may be printed 411.

Under certain operating conditions, the cropped image(s) may be archived on an archival media such as flash memory, CD, or DVD. The Epson Scrapbook Central system 100 may archive 412 the cropped image on the archival media.

After the cropped image has been printed and/or archived, the Epson Scrapbook Central system 100 may display a bill for the creating of the scrapbook page and/or the creating of the background scrapbook page by the Epson Scrapbook central system 100. The bill may be authorized and the bill may be printed 413 on the secondary printer 220. After the bill has been printed, the customer job may end and the Epson Scrapbook Central™ reproduction system 100 may return to a main menu.

Figure 7:
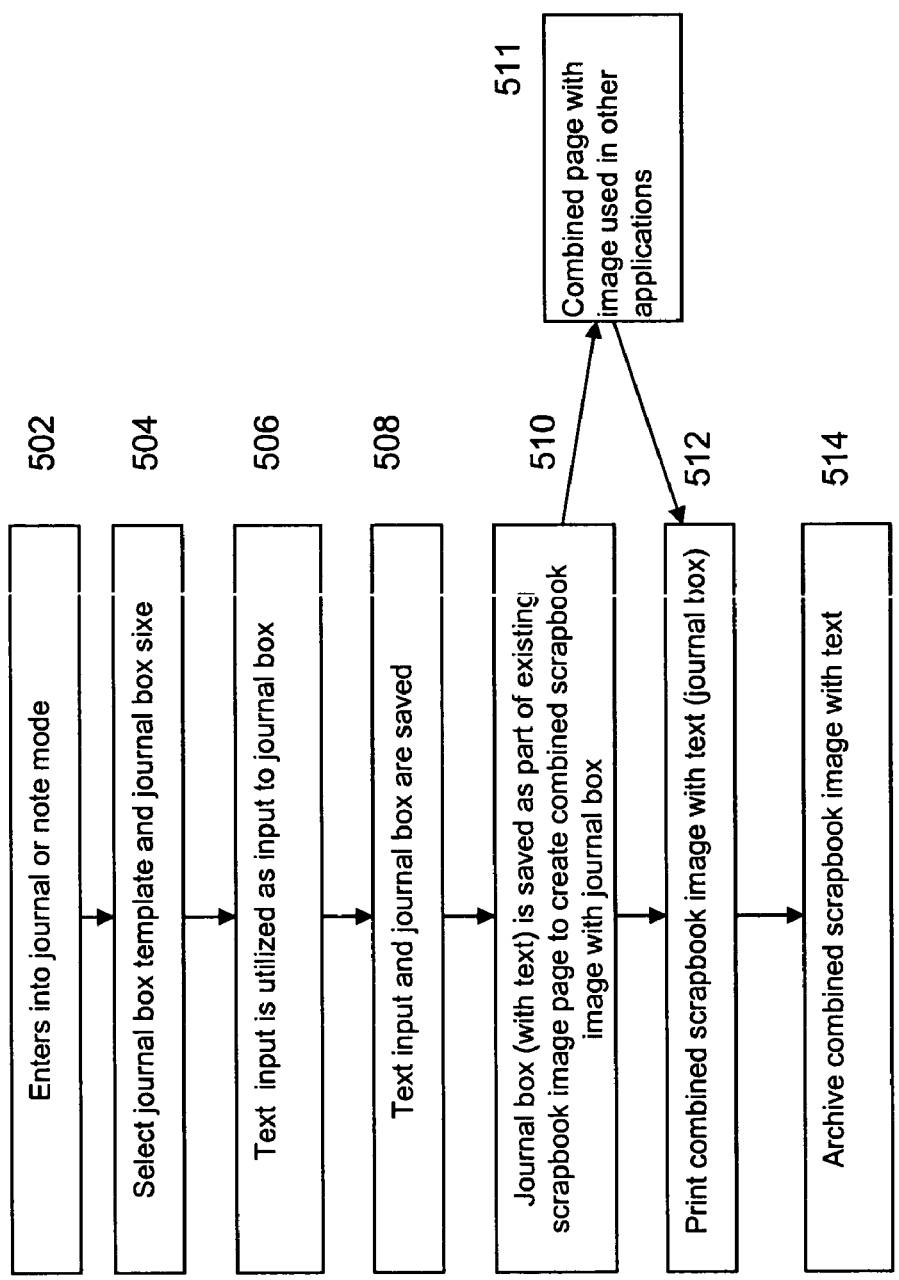
FIG. 7 illustrates a dataflow of creating journal boxes or text according to an embodiment of the present invention.

FIG. 7 illustrates a dataflow of creating journal boxes or text according to an embodiment of the present invention. The Epson Scrapbook Central™ system 100 creates journal boxes or text boxes for scrapbook pages. The Epson Scrapbook Central™ system 100 also allows for entered journal boxes, the text, to be printed out as a separate document. Under these operating conditions, the journal box may have a background that matches the scrapbook page or contrasts with the scrapbook page. The Epson Scrapbook Central system 100 enters 502 into a journal box mode. The Epson Scrapbook Central system selects 504 a journal box template and a size for the journal box template. Under certain operating conditions, sales personnel or the customer may select a size and a journal box template (or shape for the journal box). Thus, the journal box template and a size are selected.

A text entry is entered 506 into the Epson Scrapbook Central system 100 and is utilized as input for the journal box. Under certain operating conditions, a keyboard is utilized to type in the text input. The text entry may be saved 508 in memory of the Epson Scrapbook Central system 100. Under certain operating conditions, the entered text and saved text may be printed separately. In an embodiment of the invention, the entered journal box text may be printed separately to the image printer 230. In an embodiment of the invention, the entered journal box text may be printed separately to the secondary printer 220. Under certain operating conditions, multiple journal boxes may be entered onto a scrapbook page. In these operating conditions, the process would return to the selection of the journal box template and the size of the journal box template.

Once the text entry(s) are saved, the journal box(es) may be saved 510 to an existing scrapbook image. In other words, the text entered into the journal box templates, i.e., the journal boxes are combined with the existing scrapbook image. This may be referred to as a combined scrapbook image with text. The combined scrapbook image with text may be input 511 into other applications or functions within the Epson Scrapbook system 100.

The combined scrapbook image with text may be printed 512 to an image printer 230 if other applications or functions have been completed on the combined scrapbook image with text. In an embodiment of the invention, the combined scrapbook image with text may be archived 514 to archival media.

Figure 8:
FIG. 8 illustrates a number of printing options according to an embodiment of the present invention.

The Epson Scrapbook Central system 100 provides a variety of printing capabilities or outputs for input photos or images. The prints may be output in a variety of sizes including 2" by 3", 3" by 4", 3.5"×5", 4" by 6", 5" by 7", or 8" by 10". Under certain operating conditions, a number of photos, e.g., a package, may be printed on a single output page. FIG. 8 illustrates a number of printing options according to an embodiment of the present invention. As illustrated, a number of printing options may be a 4" by 6" print(s), a 5" by 7" print(s), a 8" by 10" print(s), a package (number of photographs combined on a single printed page), a greeting card print, an announcement print, a calendar print, and border option prints.

Figure 9:
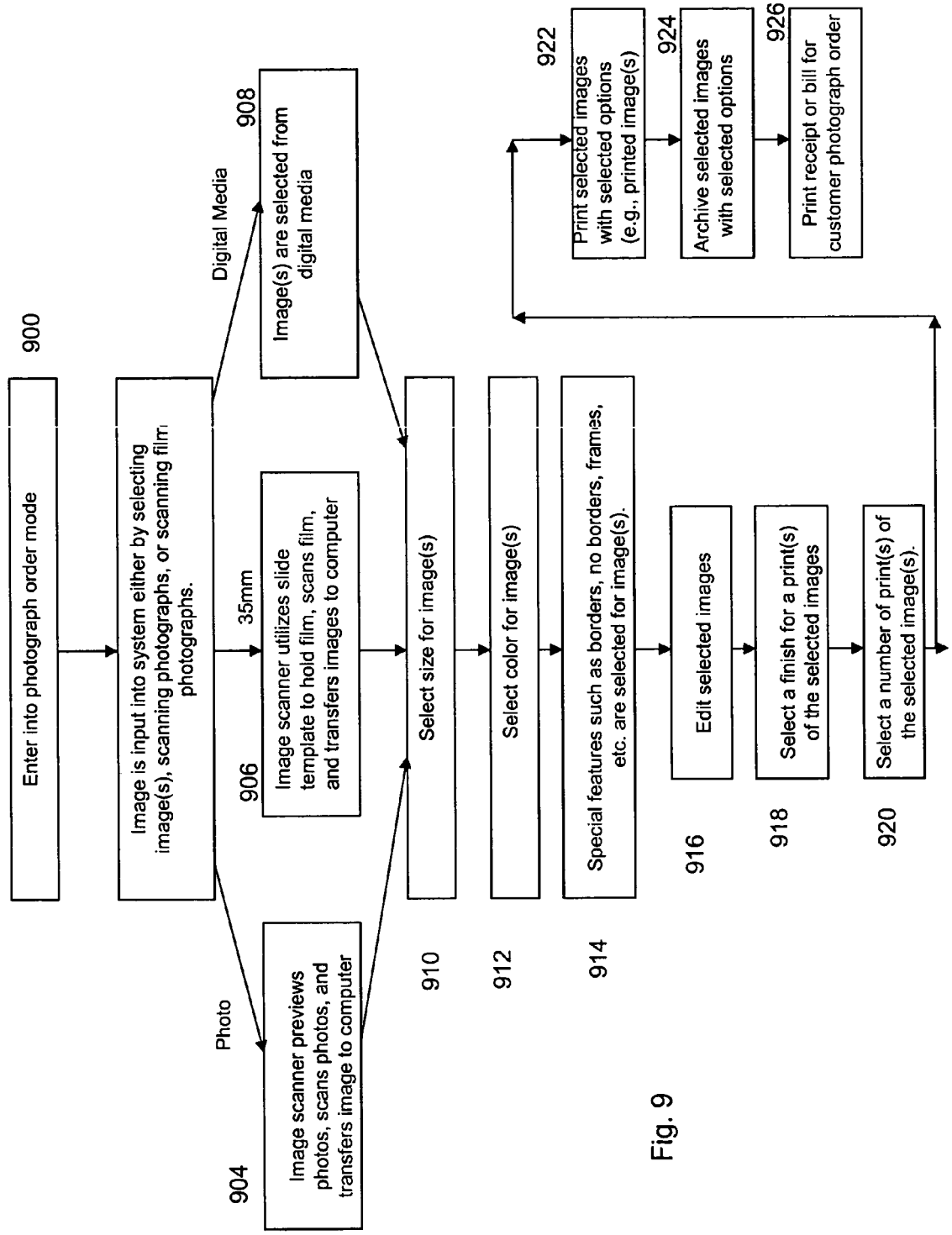
FIG. 9 illustrates a photograph order mode according to an embodiment of the present invention.

FIG. 9 illustrates a photograph order mode according to an embodiment of the present invention. The Epson Scrapbook Central™ system 100 enters 900 into photo order mode after receiving a customer order. The Epson Scrapbook Central system 100 receives 902 an image from either digital media (e.g., flash memory cards, CDs, DVDs, floppy drives), from scanning a photo, or from scanning of a filmstrip. If the image is to be received from scanning a photo, then the system 100 prompts for placement of photos on the image scanner 240. The scan may be previewed, color corrected, and then scanned 904. Under certain operating conditions, more than one scan may be performed to scan in multiple images.

The Epson Scrapbook Central™ system 100 may receive images from 35 mm film. In the image is to be input from 35 mm film, a light tray cover on the image scanner 240 may be removed or moved away from the scan area and a slide template may be placed on the scan bed. The 35 mm film is placed in the slide template and the scanner scans 906 the film to create the image.

If the image is to be received from digital media, the Epson Scrapbook Central system 100 prompts for the digital media to be input. A memory card reader, a CD, or a DVD may receive the digital input, and read the digital media. The Epson Scrapbook Central system 100 selects 908 a single photo, a plurality of photos, or all of the photos. Under certain operating conditions, the Epson Scrapbook Central system 100 may display all of the photos on the input digital media and allow for the selection of a single photo, a plurality of photos, or all of the photos.

The print size for the selected image(s) may be selected 910. A color choice for the selected image(s) may be selected 912. The color choices may be color, vivid color, black & white, sepia, and a plurality of duotone colors. Duotone colors are one color on another color. Illustrative, but not limiting, duotone colors are ruby on white and turquoise on white.

Special features may be selected 914 for the selected images. The Epson Scrapbook Central system 100 selects 614 special features for the selected image(s). Special features may include borders, having no borders, decorative frames, or soft focus for the selected image(s).

The selected images may be edited 916. The Epson Scrapbook Central™ system 100 may edit the selected image(s). Editing may include features such as red-eye removal, cropping, enlarging, reducing, or rotating of the selected image(s).

A finish of a print for the selected images (perhaps after the editing or the adding of features) may be selected 918. The Epson Scrapbook Central system 100 may select or the user may select the finish for a print of the selected image(s). A number of prints of the selected image(s) may be chosen. The Epson Scrapbook Central system 100 may select 920 a quantity or number of prints of the selected image(s).

The selected image(s) (with the selected finish, editing, and special features) may be printed 922. The Epson Scrapbook Central system 100 may print the selected images according to the inputs and selections above. This may create a printed image(s) which may be printed on the image printer 230 or the secondary printer 220.

The Epson Scrapbook Central system 100 may archive 924 the selected image(s) with the selected options (features, size, finish, editing, etc. The Epson Scrapbook Central system 100 may print 926 a bill or receipt for the job including the selected image(s) on the secondary printer 220.

Figure 10:
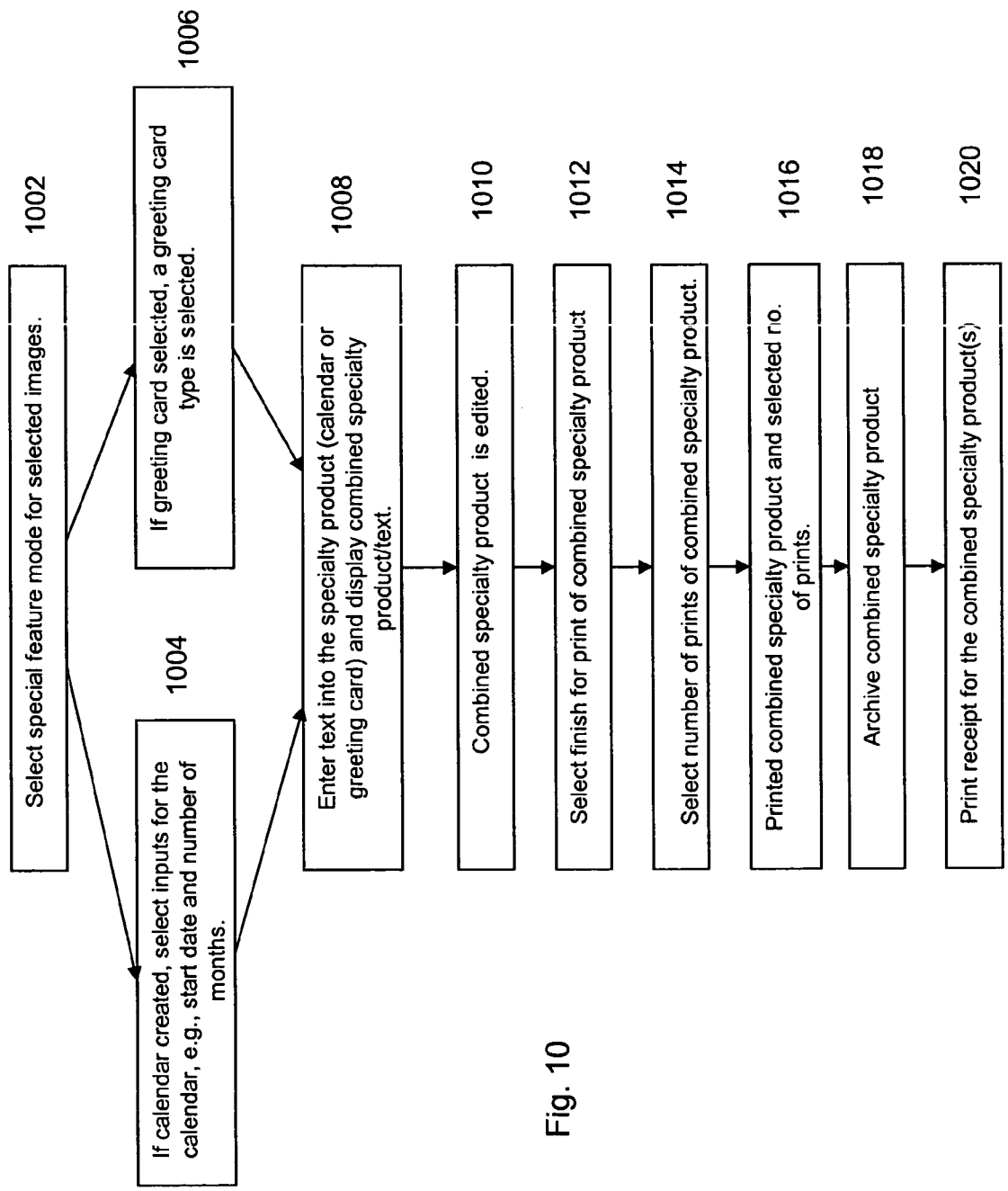
FIG. 10 illustrates creation of a specialty product according to an embodiment of the present invention.

The Epson Scrapbook Central™ system 100 creates specialty cards such as holiday cards, birthday cards, or announcements. FIG. 10 illustrates creation of a specialty product according to an embodiment of the present invention. Under certain operating conditions, the size of the greeting card is 4" by 8". The Epson Scrapbook Central™ system 100 enters the photo mode as disclosed above in regard to FIG. 6. After a color type is selected for the image, a special feature is selected 1002. Under certain operating conditions, the special features may be creation of a calendar or the creation of a greeting card. If a calendar is created 1004, a start month and number of months is selected. If a greeting card is created 1006, a card type is selected. The Epson Scrapbook Central™ system may include custom templates for greeting cards or may add greeting cards from external sources, e.g., third party greeting card templates. The Epson Scrapbook Central™ system 100 may allow for deletion of unwanted templates and also for activation of certain greeting card templates depending on the time of the year, e.g., Christmas templates or Halloween templates.

The greeting (text or symbol) which is to be inserted into the calendar or greeting card is entered 1008, combined with the greeting card or calendar, and the combined greeting card or calendar is displayed on the display screen. The combined greeting card or calendar and text may be edited 1010 (e.g., red eye removal, crop, enlarge, reduce, etc.). A finish for the combined greeting card or calendar with text is selected 1012. A quantity of the combined greeting card or calendar with text is selected 1014. The combined greeting card or calendar with text is printed 1016. The combined greeting card or calendar may be archived 1018. A receipt may be printed 1020 on the receipt printer 220 for the combined greeting card or calendar with text.

Figure 11:
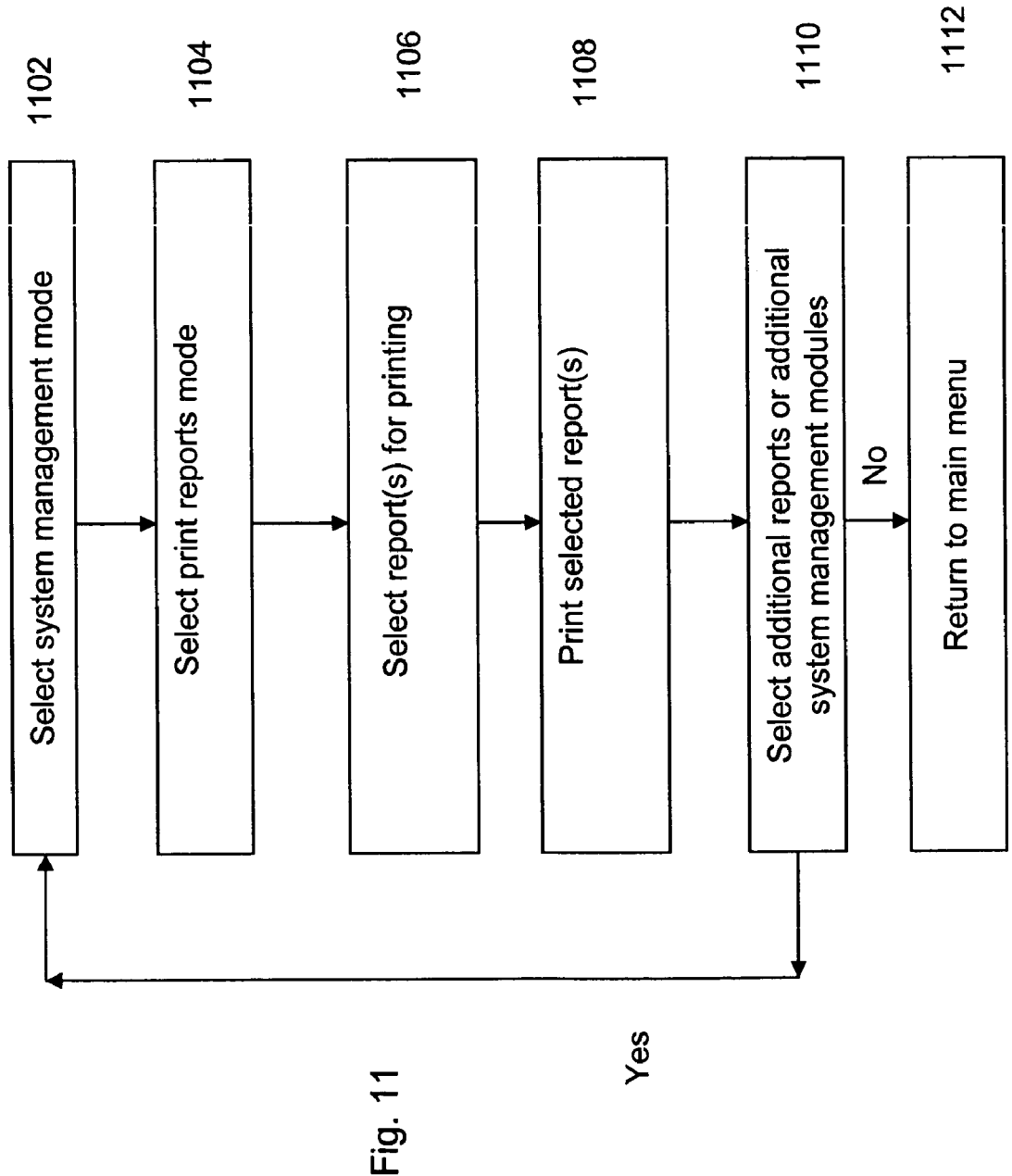
FIG. 11 illustrates creation of management reports according to an embodiment of the present invention.

The Epson Scrapbook Central™ system 100 may create sales or management reports which may be utilized by store or retail management to judge performance of the individuals and/or the retail or store in its entirety. FIG. 11 illustrates creation of management reports according to an embodiment of the present invention. The Epson Scrapbook Central system 100 may enter 1102 a system management mode. Illustratively, in the system management mode, one of five modes may be selected: 1) print reports; 2) edit system information; 3) add users or store personnel, set/change passwords or usernames; 4) system maintenance; and 5) system shut down. The Epson Scrapbook Central™ system 100 may enter 1104 a print reports module. A report may be selected 1106 for printing. Illustratively, the reports available to be printed may include daily results, product reports (how many photos, scrapbook pages, etc. have been printed); personal reports; period reports; paper usage reports; and package reports. Example reports include 1) sales by employee, by day, week or month; 2) total sales by day, week, or month; 3) total print pints made by image type; 4) total scrapbook pages made by type; 5) total packages ordered; 6) % breakdown by prints/or packages; 7) total number of edited images; 8) total number of retouched images; 9) average number of prints per order; and 9) average sales per order.

The Epson Scrapbook Central™ system 100 may print 1108 the selected report. The Epson Scrapbook central system 100 may allow for additional reports to be printed or for additional management functions to be performed 1110. If neither of these features or functions are selected, the Epson Scrapbook central system may return 1112 to the main menu.

The Epson Scrapbook Central™ system 100 may bill out customer orders or jobs at different pricing levels. Different pricing and discount levels may be entered into the system 100. Illustratively, the pricing structure may include a basic pricing or standard pricing level. The pricing structure may also include a quantity pricing rate and the quantity pricing rate may include at least three levels. The pricing structure may include a flat-rate discount rate. The pricing structure may include special pricing that has expiration dates for the special pricing, e.g., such as holiday pricing or special monthly pricing. The Epson Scrapbook Central™ system 100 may include functionality to allow a supervisory pricing override.

The Epson Scrapbook Central™ system 100 controls or directs system maintenance and peripheral maintenance. The Epson Scrapbook Central™ system monitors the number of pages printed on the image printer 230. Once a preset number of prints has been reached, the Epson Scrapbook Central™ system may issue a warning for image printer maintenance to be performed. Under certain operating conditions, the Epson Scrapbook Central™ system 100 may monitor the number of prints printed on the secondary printer 220. Once a second present number of prints has been reached, the Epson Scrapbook Central™ system may issue a warning for the secondary printer 220 maintenance to be performed.

The Epson Scrapbook Central™ system 100 may include a roll-back feature. If software hangs or encounters bugs after a certain period of use, the roll-back feature may be used. The roll-back feature may be enabled by establishing two partitions on the hard disk of the Epson Scrapbook Central™ system 100. The application functions may be kept on the C: drive of the hard disk and are initialized when the system is started. An image of the application software is kept on the D: partition of the hard disk drive. If the roll-back feature is implemented or selected, the system restores application software files from the image stored on the D: partition. A supervisor then performs normal startup and the Epson Scrapbook Central™ system 100. The Epson Scrapbook Central™ system 100 can also restore the application software and data to the C: drive from the CD drive.

The Epson Scrapbook Central™ system also allows for images to be utilized in outside, external applications, such as Adobe Photoshop Elements software and Arcsoft DVD Scrapbook Slideshow software. The Epson Scrapbook Central™ software may be utilized to scan photos and scan slides. The images may then be stored in a designated area that can be accessed from Adobe Photoshop Elements or DVD Scrapbook Slides. The Notepad feature may make notes on time and activities.

Figure 12A:
FIGS. 12(a)-12(g) illustrate sample input screens according to an embodiment of the present invention.
Figure 12B:
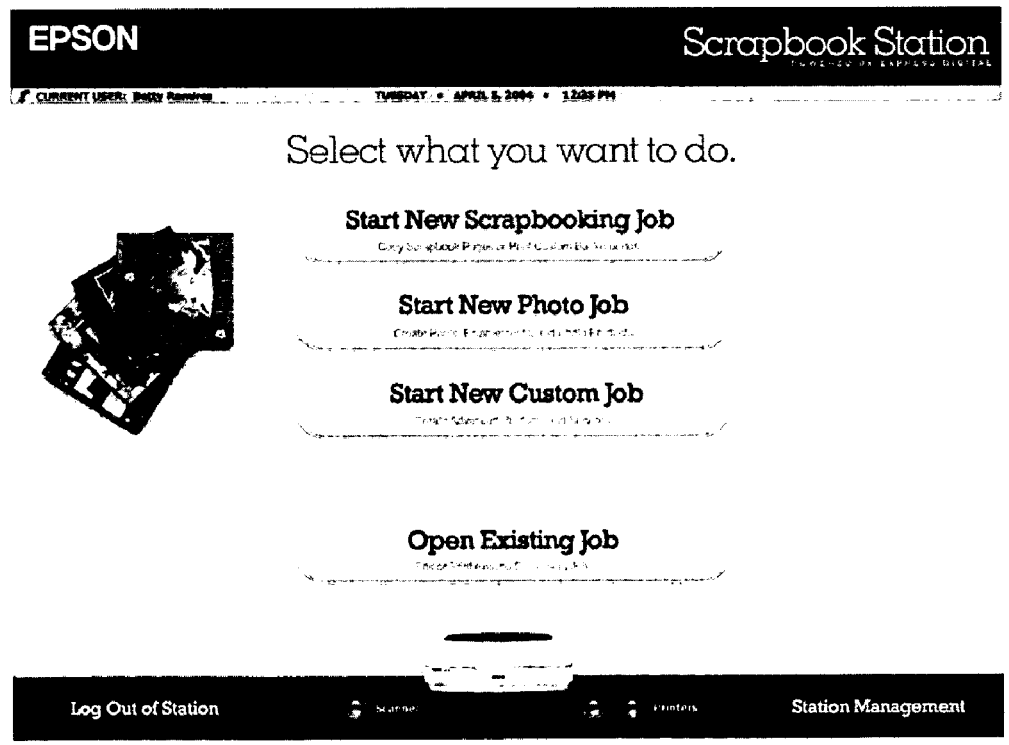

FIGS. 12(a)-12(g) illustrate sample input screens according to an embodiment of the present invention. FIG. 12(a) illustrates a login menu according to an embodiment of the present invention. A user or a supervisor may enter a username and a password and login to the system. The Epson Scrapbook Central™ system 100 may allow for different system features to be accessed depending on the user that is operating the system. FIG. 12(b) illustrates a sample main menu according to an embodiment of the present invention. A main menu may allow for selection of a new scrapbooking job, a new photo job, a new custom job, or to open an existing job. The main menu may also allow for a user to enter the station or system management feature by selecting a station management button.

Figure 12C:
Figure 12D:
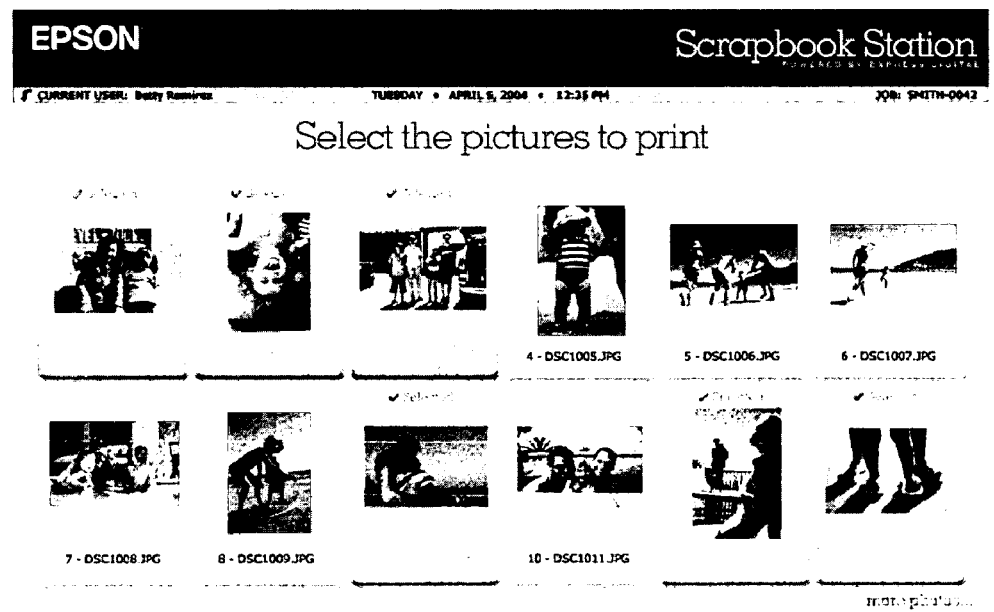

FIG. 12(c) illustrates a loading photos screen according to an embodiment of the present invention. Illustratively, images may be input from scanning or from a memory card, a CD, a DVD, a hard disk drive, or other removable magnetic media. FIG. 12(d) illustrates a photo selection screen according to an embodiment of the present invention. As illustrated, the image may be displayed as slides on the computer display. The name of file may be listed on the slide. Each of the slides may have an indication as to whether or not the slides have been selected. Under certain operating conditions, the slides may have a check mark or may be set in a different color.

Figure 12E:
Figure 12F:
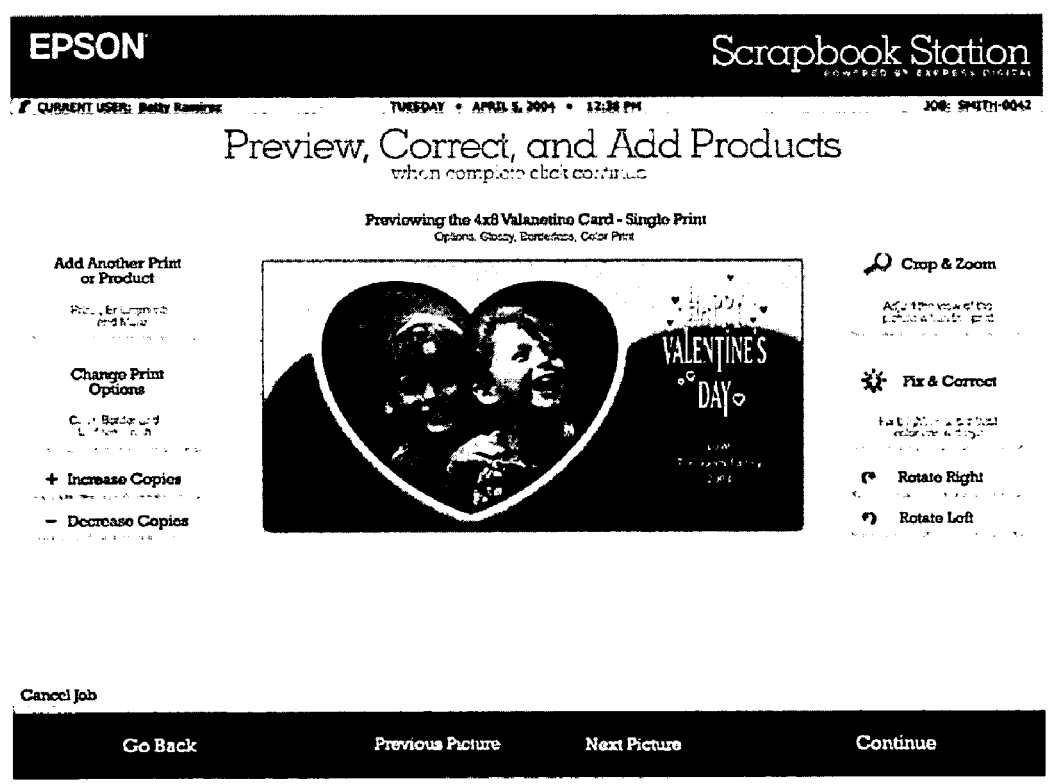

FIG. 12(e) illustrates a selecting output screen according to an embodiment of the present invention. The output selections may be 1) 4×6, 5×7, or 8×10 inch photos; 2) a package of photos on a single printed sheet; 3) a greeting card; 4) an announcement; 5) a calendar; or 6) a special border or more. FIG. 12(f) illustrates a photo correction screen according to an embodiment of the present invention. Utilizing this menu, a photo may be displayed in a specialty product on the display screen. The photo or image may be modified, enhanced, or corrected utilizing the buttons on the photo correction screen illustrated in FIG. 12(f). Another print or product may be selected with this photo correction screen. For example, a user can select different print options for the selected photo. The number of copies of the images may be increased or decreased. The image in the product may be cropped or zoomed. The image in the specialty product may be fixed or corrected. In this menu, the image in the specialty product may be rotated right or may be rotated left.

Figure 12G:
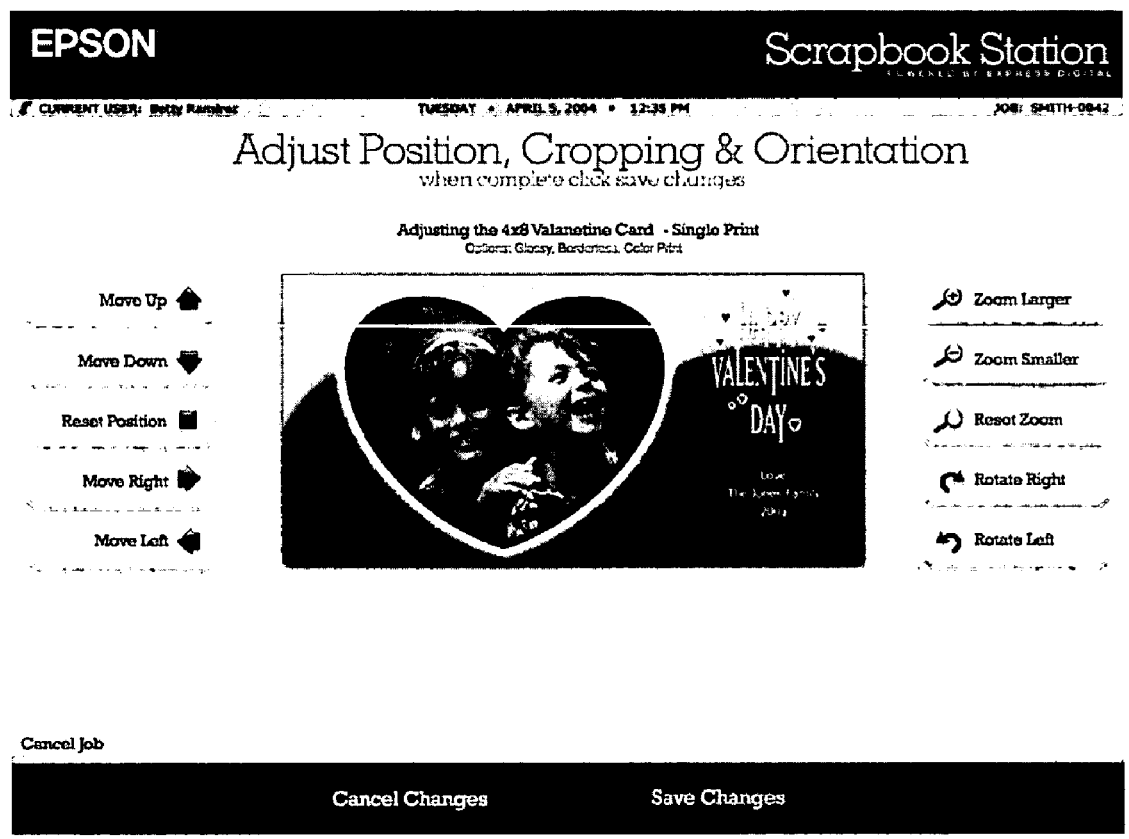

FIG. 12(g) illustrates a placement adjustment screen according to an embodiment of the present invention. In this menu, an image is displayed as part of a selected specialty product, e.g., a Valentines Day card. The placement of the image may be moved up or moved down. A new position may be set. The placement of the image in the selected specialty product may be moved left or moved right. The image in the selected specialty product may be zoomed larger, zoomed smaller or the zoom may be reset. The image in the selected specialty product may be rotated right or rotated left.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A system for copying a scrapbook page, comprising:
   a scanner to scan a full-size scrapbook page to create a full-size scrapbook image and to transfer the full-size scrapbook image;
   a computing device to receive the full-size scrapbook image and to transfer the full-size scrapbook image;
   a computing display to receive the full-size scrapbook image and to display the full-size scrapbook image; and
   an image printer to print an accepted full-size scrapbook image, wherein after the computing display displays the scrapbook, the full-size scrapbook image is accepted to create the accepted scrapbook image, and the accepted scrapbook image is transferred from the computing device to the image printer.

2. The system according to claim 1, further including printing a receipt on a receipt printer including a price for copying the scrapbook page and printing the accepted scrapbook page.

3. The system according to claim 1, wherein the scanner scans the scrapbook page in a single pass.

4. The system according to claim 1, wherein the image printer prints the accepted scrapbook page in a single pass.

5. The system according to claim 1, wherein the printer prints the accepted scrapbook page on lignin-free paper.

6. The system according to claim 1, further including a cart including shelving areas that hold the computing display, the computing device, the image printer, and the scanner.

7. The system according to claim 1, wherein the cart is transportable.

8. A method of copying a scrapbook page, comprising:
   receiving a scanned scrapbook image of a 12 inch by 12 inch scrapbook page;
   displaying the scanned scrapbook image;
   accepting the scanned scrapbook image to create an accepted scrapbook page image;
   transferring the accepted scrapbook page image to an image printer; and
   printing the transferred accepted scrapbook page image to generate the copy of the scrapbook page image.

9. The method of claim 8, wherein printing the transferred accepted scrapbook image occurs in a single pass of the image printer.

10. The method of claim 8, wherein printing occurs on a single sheet of print media and includes borderless printing.

11. The method of claim 8, wherein the scanning of the scrapbook page occurs in a single pass of an image scanner.

12. The method of claim 8, wherein the accepting of the scanned scrapbook image occurs automatically.

13. An executable code storage device, comprising:
    a machine-readable storage medium; and
    machine-readable executable code, stored on the machine-readable storage medium, the machine-readable program code having instructions, which when executed cause a computing device to:
    initiate a command to scan a full-size scrapbook page to generate a scanned scrapbook image;
    receive the scanned large size scrapbook image into the computing device memory;
    transfer the scanned large size scrapbook page image to a computer display; and
    transfer the scanned large size scrapbook page image to an image printer.

14. The executable code storage device of claim 13, including instructions which when executed cause the computing device to:
    wait for an input from a user accepting the scanned large size scrapbook page image before the transfer of the scanned large size scrapbook page image to the printer.

15. The executable code storage device of claim 13, wherein the transfer of the scanned large size scrapbook page image to the computer display and the transfer of the scanned scrapbook page image to the image printer occurs automatically after the receiving of the scanned large scrapbook page image.

16. The executable code storage device of claim 13, wherein no preview of the scan of the large size scrapbook page image is performed before the scanned large size scrapbook image is transferred.

17. The executable code storage device of claim 13, including instructions, which when executed cause the computing device to send a command to a receipt printer to print a receipt for the scanned scrapbook page.

* * * * *